US012397423B1

(12) United States Patent
Kianmajd et al.

(10) Patent No.: US 12,397,423 B1
(45) Date of Patent: Aug. 26, 2025

(54) SYSTEM FOR MOTION CONTROL OF ONE OR MORE JOINTS

(71) Applicant: AMAZON TECHNOLOGIES, INC., Seattle, WA (US)

(72) Inventors: Babak Kianmajd, Hayward, CA (US); James Ballantyne, Santa Barbara, CA (US); Michael Cheng, San Jose, CA (US); Jong Jin Park, Sunnyvale, CA (US); Nicholas Chuanji Liao, Carlsbad, CA (US); Harry S. Cheng, San Carlos, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 315 days.

(21) Appl. No.: 18/064,810

(22) Filed: Dec. 12, 2022

(51) Int. Cl.
  *B25J 9/16* (2006.01)
  *B25J 13/08* (2006.01)
  *B25J 5/00* (2006.01)

(52) U.S. Cl.
  CPC ........... *B25J 9/1651* (2013.01); *B25J 13/088* (2013.01); *B25J 5/007* (2013.01)

(58) Field of Classification Search
  CPC ......... B25J 9/1651; B25J 13/088; B25J 5/007
  See application file for complete search history.

(56) References Cited

U.S. PATENT DOCUMENTS

| | | | | |
|---|---|---|---|---|
| 11,458,626 | B2* | 10/2022 | Kimura | B25J 9/0081 |
| 2007/0010913 | A1* | 1/2007 | Miyamoto | B25J 9/1658 |
| | | | | 700/264 |
| 2014/0371905 | A1* | 12/2014 | Eberst | G05B 19/4182 |
| | | | | 700/253 |
| 2019/0118384 | A1* | 4/2019 | Dalibard | B25J 19/0008 |
| 2019/0184560 | A1* | 6/2019 | Liu | B25J 9/1605 |
| 2022/0219323 | A1* | 7/2022 | Wuensch | B25J 9/1674 |
| 2022/0305652 | A1* | 9/2022 | Reading | B25J 9/1664 |
| 2023/0339113 | A1* | 10/2023 | Kawakami | G05B 19/4103 |

OTHER PUBLICATIONS

"Bang-bang control", Wikipedia, 3 pages. Retrieved from the Internet on Nov. 30, 2022. URL: https://en.wikipedia.org/wiki/Bang%E2%80%93bang_control.

(Continued)

*Primary Examiner* — Adam R Mott
*Assistant Examiner* — Sagar Kc
(74) *Attorney, Agent, or Firm* — Lindauer Law, PLLC

(57) ABSTRACT

An autonomous mobile device (AMD) has one or more joints that move. A "choreo" comprises instructions that specify a particular set of motions. A constrained optimization algorithm determines a first time at which operation of the joint may be transitioned from a current state, such as while performing a first choreo, to a second choreo. The first time is determined to minimize motion discontinuities to less than constraint values. Constraint values may specify limits on time, position, acceleration, velocity and so forth. During the transition the joint is moved, subject to the constraints and using an optimization algorithm, toward the positions specified by the second choreo, subject to the constraint values. Synchronization of the second choreo to a specified time is maintained. The resulting movement avoids discontinuities producing a more naturalistic motion and may reduce wear and tear on the joint.

17 Claims, 10 Drawing Sheets

(56) References Cited

OTHER PUBLICATIONS

Castro, Sebastian, "Trajectory Planning for Robot Manipulators", MathWorks Editor, Nov. 6, 2019, 6 pages. Retrieved from the Internet: URL: https://medium.com/mathworks/trajectory-planning-for-robot-manipulators-522404efb6f0.

Jacic, et al., "Bang-Bang Optimal Control Algorithm—A Solution Via Modified Nonlinear Optimization Approach" Abstract, p. 221.

Liu, et al., "A Review of Motion Planning Algorithms for Robotic Arm Systems", In: 8th International Conference on Robot Intelligence Technology and Applications (proceedings). The 8th International Conference on Robot Intelligence Technology and Applications, Dec. 11-13, 2020, Cardiff. IEEE, GBR, 12 pages. Repository copy from White Rose Research Online, University of York, UK.

* cited by examiner

SYSTEM FOR MOTION CONTROL OF ONE OR MORE JOINTS

INCORPORATION BY REFERENCE OF COMPUTER PROGRAM LISTING APPENDIX

This disclosure incorporates by reference the material submitted in the Computer Program Listing Appendix filed herewith.

BACKGROUND

A device, such as an autonomous mobile device (AMD), has one or more joints that move at least a portion of the device within a physical space.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
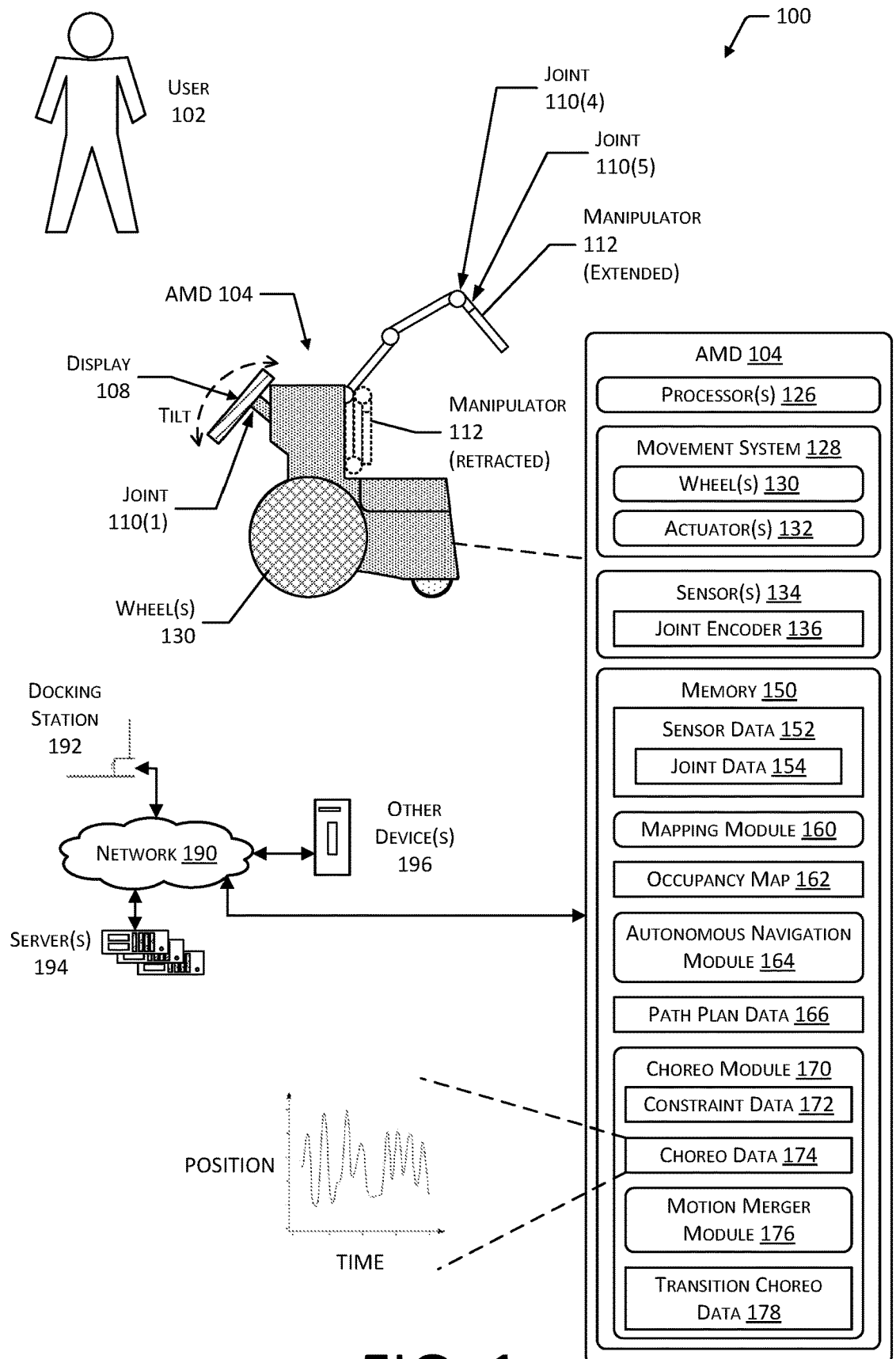
FIG. 1 illustrates an autonomous mobile device (AMD) with a choreography ("choreo") module that transitions from a first choreo to a second choreo, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "Including, but not limited to".

DETAILED DESCRIPTION

Devices, such as an autonomous mobile device (AMD), may have joints with associated actuators that allow some portion of the device to move. For example, an AMD may have a display attached to a joint that allows the display to be tilted. In another example, the AMD may have a manipulator, such as an arm with end effector, that has several joints to provide different degrees of freedom.

A joint, or set of joints, may be commanded to move to a set of specified positions. A set of positions with respect to time may be referred to as a choreography or "choreo". For example, the choreo may comprise information about a plurality of positions of the joint at respective specified times.

The joint of the device may be performing a first choreo at a first time. In some situations the first choreo may describe no movement, such as if the joint is not moving. The joint may be instructed to begin presenting a second choreo. Traditional approaches to transitioning from one set of movements to another introduce various issues. For example, techniques such as abruptly transitioning from one position to another, such as in a "bang bang" method, may result in discontinuities in one or more of position, velocity, or acceleration. This may result in jerky or abrupt motions that are unsettling to nearby users. Such discontinuities may produce mechanical stress on the joint and associated mechanisms. Continuing the example, those abrupt transitions from one motion to another may result in excessive transient mechanical forces on the joint that cause damage. Traditional approaches such as use of spline curves or moving to a specified position between different sets of movement, may be used. However, these approaches may result in various issues such as being computationally complex, moving the joint more than necessary shortening the overall life and using additional power, or introducing latency that may result in a loss of time synchronization that specifies what position the joint is commanded to be in at a specified time.

Described in this disclosure are techniques and systems for motion control of one or more joints to transition from a first choreo to a second choreo. Each choreo may comprise a respective set of positions associated with specified times. Constraint data specifies a maximum velocity and acceleration that the joint is permitted to attain. An optimization algorithm determines a feasible time to begin a transition choreo, based on the constraint data, a first position such as the current position of the joint, and a second position such as a position specified in the second choreo at successive times in the future.

In one implementation, a time may be deemed feasible to begin if the transition from the current position to the second position has an associated maximum velocity that is less than a threshold maximum velocity, a first acceleration from a first position to an intermediate position is less than a threshold maximum acceleration, and a second acceleration from the intermediate position to a second position is less than the threshold maximum acceleration.

Once a feasible second time has been determined, based on the current position and velocity and the second position one or more of next positions or next velocities are calculated. A triangle optimization algorithm is used to determine the successive next positions or velocities, moving the joint from the current first position at the first time to the next positions until the second position is attained at the second time. At the second time, the transition is complete and the second choreo proceeds to be used to operate the joint.

By using the techniques and systems described herein, the resulting motion of the joint is smoother and more naturalistic. The resulting motion results in an improved experience for users who observe the joint in motion. The resulting motion may also reduce mechanical wear and tear on the joint and associated components, and discontinuities in motion are avoided or minimized, avoiding spikes of mechanical forces in the joint. The resulting motion also avoids the latency associated with having the joint move to a pre-set position in between choreos. The resulting motion determined by the techniques and systems described herein also maintain time synchronization, such that motions in the second choreo occur at specified times as planned. This allows the joint to provide movements that are time synchronized, such as movements that are coordinated with presentation of music, video, or operation of other devices, and so forth. For example, a pair of manipulators that pass an object from one hand to another may be time synchronized such that a transfer of an object held by a first manipulator is smoothly and quickly transferred at a specified time to a second manipulator.

Illustrative System

FIG. 1 illustrates at 100, a user 102 in a physical space that includes a device, such as an autonomous mobile device (AMD) 104. The AMD 104 may include a display 108. The AMD 104 may comprise one or more joints 110 that provide movement between two or more portions of the AMD 104. The joint 110 may comprise, or be moved by, one or more actuators 132. The actuators 132 may comprise one or more of rotary motors, linear motors, pneumatic actuators, hydraulic actuators, electroactive polymers, and so forth. In some implementations the joint 110 may comprise a portion of the actuator 132. For example, an axle of a rotary motor may comprise the joint 110. In another example, the joint 110 may comprise a mechanical linkage, hinge, or other mechanism that is moved by one or more actuators 132.

In the implementation depicted, the display 108 is affixed to a joint 110(1). Operation of the joint 110(1) changes the tilt of the display 108, relative to horizontal. In some implementations, one or more additional joints 110 (not shown) may allow the display 108 to be moved in a panning motion, rotated about an axis perpendicular to a plane of the display 108, and so forth. The AMD 104 may include other joints 110.

The AMD 104 may comprise one or more manipulators 112. Each manipulator may comprise one or more joints 110. For example, the manipulator 112 shown in FIG. 1 may comprise joints 110(2)-110(5) with an end effector on a distal end of the manipulator 112. The manipulator 112 may transition between a retracted position and an extended position.

The AMD 104 includes one or more hardware processors 126 (processors) configured to execute one or more stored instructions. The processors 126 may comprise one or more cores. The processors 126 may include microcontrollers, systems on a chip, field programmable gate arrays, digital signal processors, graphic processing units, general processing units, and so forth.

The AMD 104 includes a movement system 128 that enables movement of at least a portion of the AMD 104 or the entire device within the physical space. The movement system 128 may comprise one or more wheels 130 driven by one or more actuators 132 or other actuators to enable the AMD 104 to move from one location in the physical space to another. For example, an actuator 132 may be used to drive a wheel 130 attached to a chassis of the AMD 104, which causes the AMD 104 to move. In some implementations, the AMD 104 may include non-driven wheels, such as casters. The AMD 104 may turn, move forward, move backward, and so forth. In another example, actuators may move legs allowing the AMD 104 to walk. In some implementations a body of the device may be stationary while one or more portions are moveable, such as the display 108, a manipulator 112, and so forth. For example, a first actuator 132(1) comprising a rotary motor may be used to move the joint 110(1) and tilt the display 108, actuators 132(2)-(5) may be used to move the joints 110(2)-(5) to move the manipulator 112, and so forth.

The AMD 104 includes one or more sensors 134. The sensors 134 may include one or more joint encoders 136, or other sensors. The joint encoder(s) 136 may comprise an optical encoder, Hall effect sensor, motor control circuitry, or other devices to determine a position of a joint 110 or a mechanical linkage associated with the joint 110. The sensors 134 are discussed in more detail with regard to FIG. 3.

The AMD 104 includes one or more memories 150. These may store sensor data 152 acquired by one or more of the sensors 134, such as joint data 154. For example, the joint encoder 136 may provide as output joint data 154 indicative of one or more of an angular position, angular velocity, angular acceleration, and so forth of a joint 110 that provides rotational movement. The joint data 154 may comprise a time series of measurements acquired at specified sample times.

A mapping module 160 may use sensor data 152 to determine an occupancy map 162. The occupancy map 162 is indicative of one or more obstacles and their locations in the physical space. For example, the occupancy map 162 may indicate the presence of objects such as walls, furniture, and so forth.

An autonomous navigation module 164 provides the AMD 104 with the ability to navigate within the physical space without real-time human interaction. The autonomous navigation module 164 may implement, or operate in conjunction with, the mapping module 160 to determine the occupancy map 162. For example, the autonomous navigation module 164 and the mapping module 160 may perform an exploration of the physical space to use sensors 134 such as cameras or LIDAR to acquire sensor data 152 about the physical space that is then used to determine the occupancy map 162. The autonomous navigation module 164 may generate path plan data 166 that is indicative of a path through the physical space from the current location of the AMD 104 to a destination location based on the occupancy map 162. The AMD 104 may then begin moving along the path. The autonomous navigation module 164 is discussed in more detail with regard to FIG. 2.

The memory 150 may also store a choreo module 170. The choreo module 170 may store or otherwise access constraint data 172 associated with the AMD 104. The constraint data 172 may be representative of kinematic constraints of one or more of the joints 110 that are operated based on output from the choreo module 170. The kinematic constraints may be indicative of a maximum acceleration, maximum velocity, or other values. The kinematic constraints may be specified for particular joints 110. In some implementations the kinematic constraints may be asymmetrical, such that motion in a first direction has a first set of constraints while motion in a second direction has a second set of constraints with one or more values differing from the first set of constraints.

In some implementations, the values of constraint data 172 utilized may be determined based on one or more operating parameters of the AMD 104. The operating parameters may be associated with one or more of the AMD 104 or components thereof, the physical space, objects in the vicinity, objects being manipulated, and so forth. In some implementations, the one or more parameters may comprise extended length, loaded weight, classification of payload, distance to closest object, and so forth. For example, a manipulator 112 that is able to extend or retract to change its length may have different constraint values based on the length, such as due to the change in moment of the arm. In another example, as the loaded weight on a joint 110 increases, the maximum velocity may decrease. In another example, payloads may be classified into classifications such as {living_thing}, {inanimate_object}, {fragile}, and so forth. Based on the classification of the payload, different values of constraints in the constraint data 172 may be determined. For example, if the manipulators 112 are moving a pet carrier containing a puppy, the maximum velocity and maximum acceleration may be lower values than if moving an inanimate object such as a book. In another example, the values of the constraint data 172 used by the choreo module 170 may be determined based on the distance to the closest object. Continuing the example, as the proximity to an object to the AMD 104 decreases, the values of the maximum acceleration and the maximum velocity may also decrease.

Choreo data 174 comprises data indicative of movements of a joint 110 with respect to time. In one implementation choreo data 174 may comprise a time series of a plurality of positions of a specified joint 110. The positions specified by the choreo data 174 may be absolute or relative positions. For example, an absolute position may specify a particular angular displacement relative to a specified angle, such as a zero value of a joint encoder 136. In another example, a relative position may specify the angular displacement relative to an arbitrary angle, such as a "+10 degrees relative to current position".

For ease of illustration, and not as a limitation, the implementations described in this disclosure refer to a single joint 110 having a single degree of freedom. It is understood that the systems and techniques described herein may be extended to operate one or more joints 110 providing one or more degrees of freedom.

At a given time, the joint 110 is in a first state having a position and velocity represented by the joint data 154. The joint 110 may be performing a first choreo, or may be stationary. The choreo module 170 may receive a second choreo to perform, or an instruction to transition the joint 110 from the first state to performing the second choreo.

The choreo module 170 may comprise a motion merger module 176 that determines a transition choreo 178 to transition from the first state or first choreo to the second choreo. The motion merger module 176 implements an optimization algorithm that is discussed in more detail with regard to FIGS. 4-10. The optimization algorithm uses the current position and velocity of the joint 110 such as indicated by the joint data 154, the constraint data 172, and the second choreo data 174 to determine a series of movements of the joint 110 to rapidly transition the joint 110 to the positions specified by the second choreo data 174 at the times specified by the second choreo data 174. During operation, the choreo module 170 and the motion merger module 176 may maintain time synchronization of the movements of the joint 110 relative to a specified timebase, such as provided by a clock of the AMD 104. As a result, the choreo module 170 is able to provide time synchronized motions, such as moving the joint 110 in accordance with other output such as audio output, video output, to provide temporally coordinated motion with other joints 110, to provide temporally coordinated motion with other devices, and so forth.

The output from the motion merger module 176 may be used to control operation of the one or more joints 110 or the actuator(s) 132 associated with the one or more joints 110. For example, the transition choreo 178 may comprise a time series of positions that are provided to a motor controller that operates the actuator 132 that moves the joint 110. The motor controller then drives the actuator 132 to move to the specified positions of the time series at the specified times.

The motion merger module 176 may operate while the chassis of the AMD 104 is stationary or in motion. For example, the motion merger module 176 may perform a merger to a specified choreo while the AMD 104 is moving. In some implementations, the motion of the AMD 104, the pose data about the position and orientation of the AMD 104, or other information may be used to determine the choreo data 174. For example, the choreo data 174 may specify that the AMD 104 place the end effector of the manipulator 112 at a particular point in space at a particular time. Based on the motion and pose data of the AMD 104, the choreo data 174 may be calculated.

The AMD 104 may use network interfaces to connect to a network 190. For example, the network 190 may comprise a wireless local area network, that in turn is connected to a wide area network such as the Internet.

The AMD 104 may be configured to dock or connect to a docking station 192. The docking station 192 may provide external power which the AMD 104 may use to charge a battery of the AMD 104.

The docking station 192 may also be connected to the network 190. For example, the docking station 192 may be configured to connect to the wireless local area network 190 such that the docking station 192 and the AMD 104 may communicate.

The AMD 104 may access one or more servers 194 via the network 190. For example, the AMD 104 may utilize a wakeword detection module to determine if a user 102 is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user 102 to one or more servers 194 for further processing. The servers 194 may process the spoken audio and return to the AMD 104 data that may be subsequently used to operate the AMD 104.

The AMD 104 may also communicate with other devices 196. The other devices 196 may include one or more devices that are within the physical space such as a home or associated with operation of one or more devices in the physical space. For example, the other devices 196 may include a doorbell camera, a garage door opener, a refrigerator, washing machine, and so forth. In some implementations, the other devices 196 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

Figure 2:
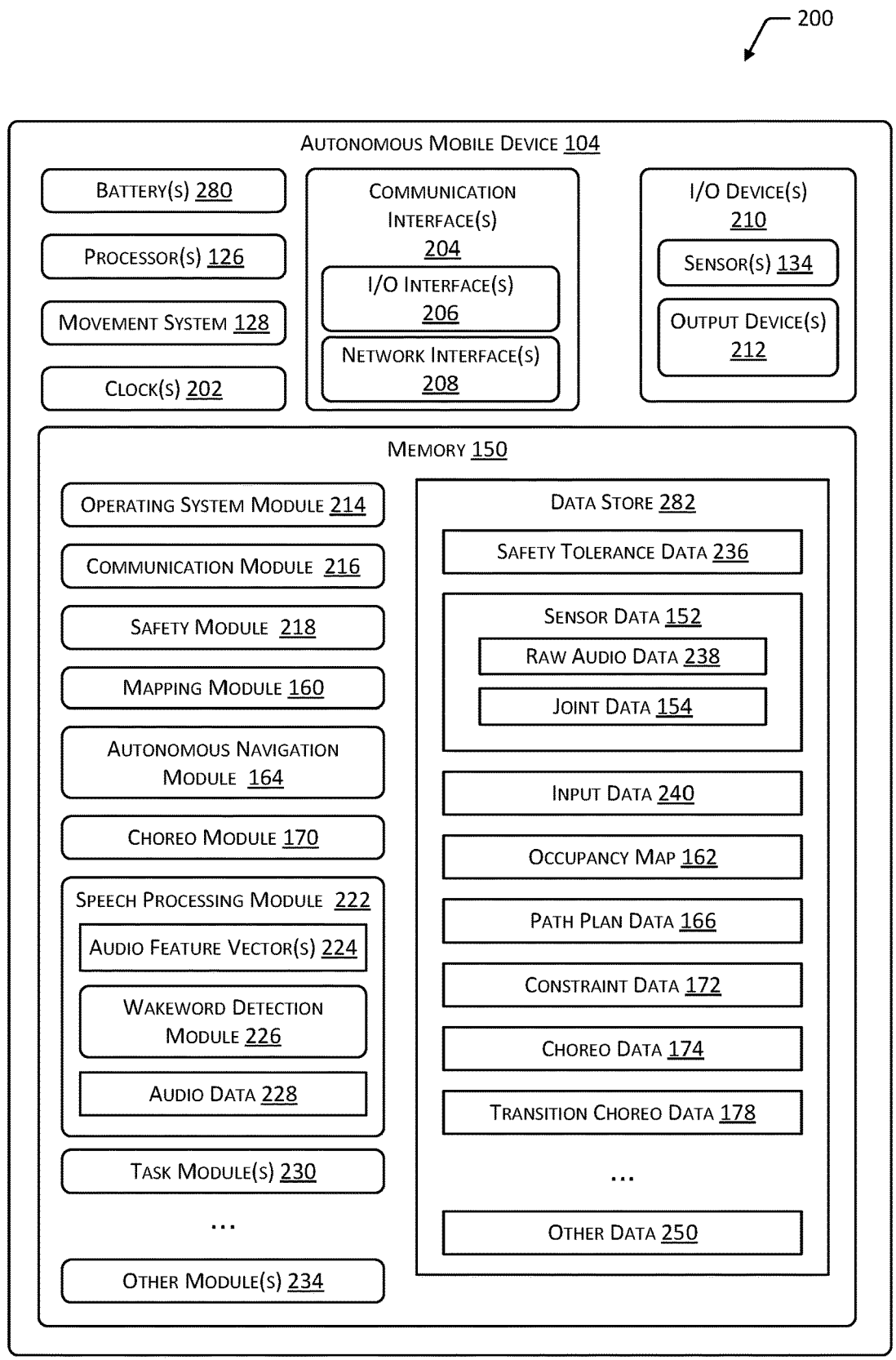
FIG. 2 is a block diagram of the AMD, according to some implementations.

FIG. 2 is a block diagram 200 of the AMD 104, according to some implementations.

The AMD 104 may include one or more batteries 280 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

The AMD 104 may include one or more hardware processors 126 (processors) configured to execute one or more stored instructions. The processors 126 may comprise one or more cores. The processors 126 may include microcontrollers, systems on a chip, field programmable gate arrays, digital signal processors, graphic processing units, general processing units, and so forth.

The movement system 128 of the AMD 104 may include one or more wheels 130 that are driven by one or more actuators 132 or other actuators to enable the AMD 104 to move from one location in the physical space to another.

One or more clocks 202 may provide information indicative of date, time, ticks, and so forth. For example, the processor 126 may use data from the clock 202 to associate a particular time with an action, sensor data 152, and so forth.

The AMD 104 may include one or more communication interfaces 204 such as input/output (I/O) interfaces 206, network interfaces 208, and so forth. The communication interfaces 204 enable the AMD 104, or components thereof, to communicate with other devices 196 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 210. The I/O devices 210 may include input devices such as one or more of a sensor 134, keyboard, mouse, scanner, and so forth. The I/O devices 210 may also include output devices 212 such as one or more of an actuator 132, light, speaker, display, projector, printer, and so forth. In some embodiments, the I/O devices 210 may be physically incorporated with the AMD 104 or may be externally placed.

The network interfaces 208 may be configured to provide communications between the AMD 104 and other devices 196 such as other AMDs 104, docking stations 192, routers, access points, and so forth. The network interfaces 208 may include devices configured to couple to personal area networks (PANs), local area networks (LANs), wireless local area networks (WLANS), wide area networks (WANs), and so forth. For example, the network interfaces 208 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104.

As shown in FIG. 2, the AMD 104 includes one or more memories 150. The memory 150 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 150 provides storage of computer-readable instructions, data structures, program modules, and other data for the operation of the AMD 104. A few example functional modules are shown stored in the memory 150, although the same functionality may alternatively be implemented in hardware, firmware, or as a system on a chip (SoC).

The memory 150 may include at least one operating system (OS) module 214. The OS module 214 is configured to manage hardware resource devices such as the I/O interfaces 206, the I/O devices 210, the communication interfaces 204, and provide various services to applications or modules executing on the processors 126. The OS module 214 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; or the Robot Operating System (ROS).

Also stored in the memory 150 may be a data store 282 and one or more of the following modules. These modules may be executed as foreground applications, background tasks, daemons, and so forth. The data store 282 may use a flat file, database, linked list, tree, executable code, script, or other data structure to store information. In some implementations, the data store 282 or a portion of the data store 282 may be distributed across one or more other devices 196 including other AMDs 104, servers 194, network attached storage devices, and so forth.

A communication module 216 may be configured to establish communication with other devices 196, such as other AMDs 104, an external server 194, a docking station 192, and so forth. The communications may be authenticated, encrypted, and so forth.

Other modules within the memory 150 may include a safety module 218, the mapping module 160, the autonomous navigation module 164, the choreo module 170, a speech processing module 222, one or more task modules 230, or other modules 234. The modules may access data stored within the data store 282, including safety tolerance data 236, sensor data 152 including the joint data 154, the occupancy map 162, path plan data 166, constraint data 172, choreo data 174, transition choreo 178, other data 250, and so forth.

The safety module 218 may access the safety tolerance data 236 to determine within what tolerances the AMD 104 may operate safely within the physical space. The safety module 218 may include, or operate in conjunction with, a collision avoidance system. For example, the safety module 218 may be configured to stop the AMD 104 from moving when an obstacle is determined to be present along the AMD's 104 path of travel. Movement of the AMD 104 may be stopped by one or more of inhibiting operations of one or more of the actuators 132, issuing a command to stop motor operation, disconnecting power from one or more of the actuators 132, and so forth. The safety module 218 may be implemented as hardware, software, or a combination thereof.

The safety module 218 may control other factors, such as a maximum speed of the AMD 104 based on information obtained by the sensors 134, precision and accuracy of the sensor data 152, and so forth. For example, a maximum speed permitted by the safety module 218 may be based on one or more factors such as the weight of the AMD 104, nature of the floor, distance to a nearest obstacle, and so forth.

As the AMD 104 moves through the physical space, the mapping module 160 may use sensor data 152 to determine the occupancy map 162 of the physical space. For example, image data from one or more cameras may be processed to determine the presence of objects, approximate locations in the physical space, category of object, and so forth. The occupancy map 162 may represent dimensions of the physical space and obstacles within the physical space. The occupancy map 162 may also include information about the object, such as size, position, and orientation.

In some implementations, the occupancy map 162 may comprise a plurality of cells with each cell of the plurality of cells representing a particular area in the physical space. The occupancy map 162 may indicate whether an area of the physical space associated with a given cell includes an object or other obstacle.

The autonomous navigation module 164 provides the AMD 104 with the ability to navigate within the physical space without real-time human interaction. The autonomous navigation module 164 may implement, or operate in conjunction with, the mapping module 160 to determine the occupancy map 162 or other representation of the physical space. In one implementation, the mapping module 160 may use one or more simultaneous localization and mapping ("SLAM") techniques. The SLAM algorithms may utilize one or more maps, algorithms, beacons, or other techniques to navigate. The autonomous navigation module 164 may use the occupancy map 162 to determine a set of possible paths along which the AMD 104 may move. One of these may be selected and used to determine path plan data 166 indicative of a path. For example, a possible path that is the shortest or has the fewest turns may be selected and used to determine the path. The path is then subsequently used to determine a set of commands that drive the actuators 132 connected to the wheels 130.

The autonomous navigation module 164 may utilize various techniques during processing of sensor data 152. For example, Image data obtained from cameras on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 126, in response to a command received from one or more communication interfaces 204, as determined from the sensor data 152, and so forth. For example, an external server 194 may send a command that is received using the network interface 208. This command may direct the AMD 104 to proceed to find a particular user 102, follow a particular user 102, and so forth. The AMD 104 may then process this command and use the autonomous navigation module 164 to determine the directions and distances associated with carrying out the command. For example, the command to "come here" may result in the task module 230 sending a command to the autonomous navigation module 164 to move the AMD 104 to a particular location near the user 102 and orient the AMD 104 in a particular direction.

The choreo module 170 operates one or more joints 110 or the actuators 132 associated with those joints 110. The choreo module 170 may determine a transition choreo 178 to transition the joint 110 from a first state to performing a second choreo.

The speech processing module 222 may be used to process utterances of the user 102. Microphones may acquire audio in the presence of the AMD 104 and may send raw audio data 238 to an acoustic front end (AFE). The AFE may transform the raw audio data 238 (for example, a single-channel, 16-bit audio stream sampled at 16 kHz), acquired by the microphone, into audio feature vectors 224 that may ultimately be used for processing by various components, such as a wakeword detection module 226, speech recognition engine, or other components. The AFE may reduce noise in the raw audio data 238. The AFE may also perform acoustic echo cancellation (AEC) or other operations to account for output audio data that may be sent to a speaker of the AMD 104 for output. For example, the AMD 104 may be playing music or other audio that is being received from a network 190 in the form of output audio data. To avoid the output audio interfering with the device's ability to detect and process input audio, the AFE or other component may perform echo cancellation to remove the output audio data from the input raw audio data 238, or other operations.

The AFE may divide the raw audio data 238 into frames representing time intervals for which the AFE determines a number of values (i.e., features) representing qualities of the raw audio data 238, along with a set of those values (i.e., a feature vector or audio feature vector 224) representing features/qualities of the raw audio data 238 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 238, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 238) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may Include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user 102 intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 238 or the audio feature vectors 224) to one or more server(s) 194 for speech processing. The audio data 228 corresponding to audio obtained by the microphone may be processed locally on one or more of the processors 126, sent to a server 194 for routing to a recipient device or may be sent to the server 194 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by another module of the AMD 104, prior to sending to the server 194, and so forth.

The speech processing module 222 may include or access an automated speech recognition (ASR) module. The ASR module may accept as input raw audio data 238, audio feature vectors 224, or other sensor data 152 and so forth and may produce as output the input data 240 comprising a text string or other data representation. The input data 240 comprising the text string or other data representation may be processed by one or more modules of the AMD 104 to determine the command to be executed. For example, the utterance of the command "robot, come here" may result in input data 240 comprising the text string "come here". The wakeword "robot" may be omitted from the input data 240.

The AMD 104 may connect to the network 190 using one or more of the network interfaces 208. In some implementations, one or more of the modules or other functions described here may execute on the processors 126 of the AMD 104, on the server 194, or a combination thereof. For example, one or more servers 194 may provide various functions, such as ASR, natural language understanding (NLU), providing content such as audio or video to the AMD 104, and so forth.

The other modules 234 may provide other functionality, such as object recognition, speech synthesis, user identification, and so forth. The other modules 234 may comprise a speech synthesis module that is able to convert text data to human speech. For example, the speech synthesis module may be used by the AMD 104 to provide speech that a user 102 is able to understand.

The data store 282 may store the other data 250 as well. For example, localization settings may indicate local preferences such as language, user identifier data may be stored that allows for identification of a particular user 102, and so forth.

Modules described herein, such as the mapping module 160, may provide various processing functions such as de-noising, filtering, and so forth. Processing of sensor data 152, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; Willow Garage of Menlo Park, California, USA; and Itseez of Nizhny Novgorod, Russia. In another implementation, functions available in the OKAO machine vision library as promulgated by Omron Corporation of Kyoto, Japan, may be used to process the sensor data 152. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), deep CNNs (DCNNs), active appearance models (AAMs), active shape models (ASMs), principal component analysis (PCA), cascade classifiers, and so forth, may also be used to process the sensor data 152 or other data. For example, the ANN may be trained using a supervised learning algorithm such that object identifiers are associated with images of particular objects within training images provided to the ANN. Once trained, the ANN may be provided with the sensor data 152 and produce output indicative of the object identifier.

Figure 3:
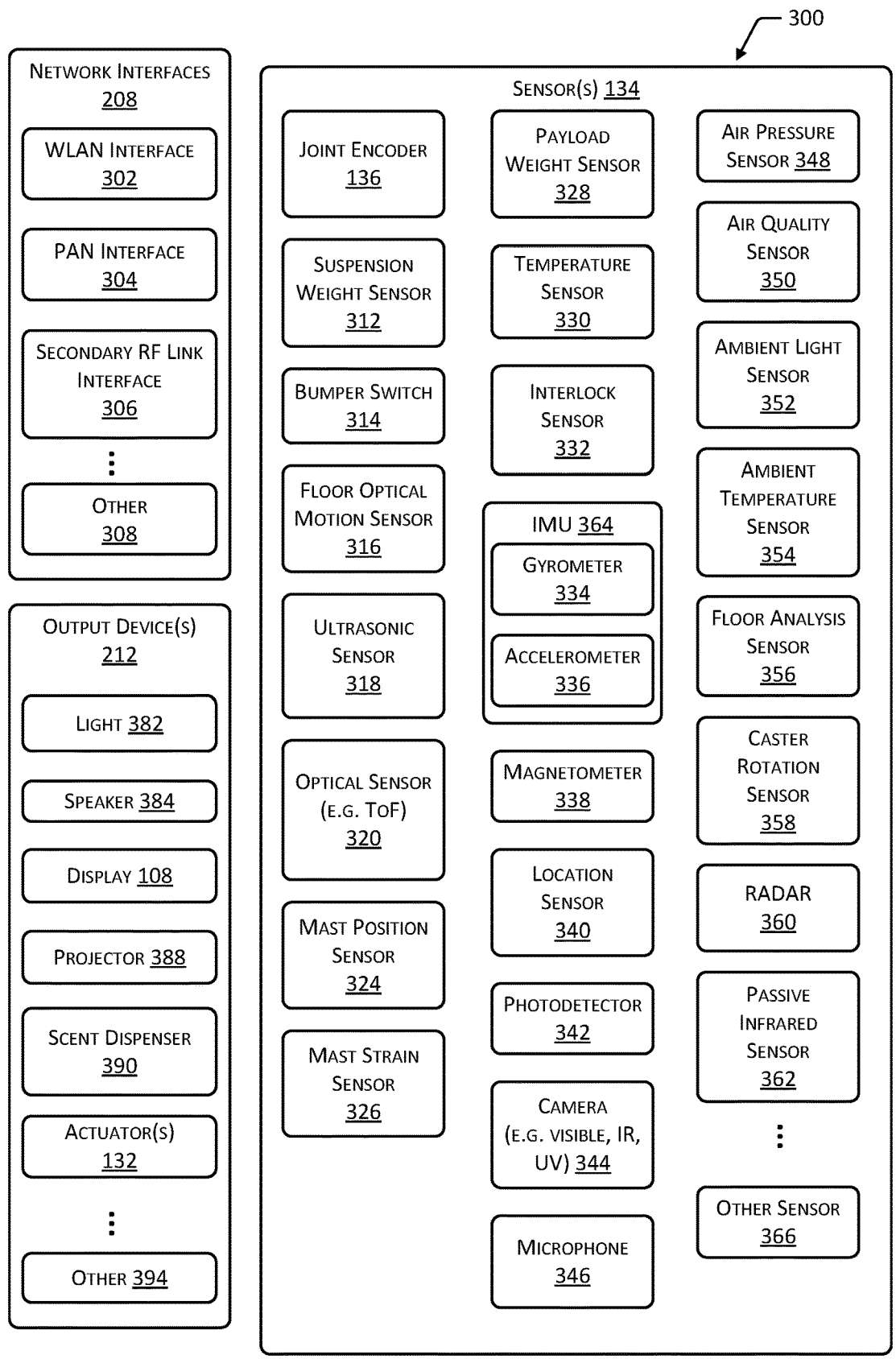
FIG. 3 is a block diagram of some components of the AMD, according to some implementations.

FIG. 3 is a block diagram 300 of some components of the AMD 104 such as network interfaces 208, sensors 134, and output devices 212, according to some implementations. The components Illustrated here are provided by way of illustration and not necessarily as a limitation. For example, the AMD 104 may utilize a subset of the particular network interfaces 208, output devices 212, or sensors 134 depicted here, or may utilize components not pictured. One or more of the sensors 134, output devices 212, or a combination thereof may be included on a moveable component that may be panned, tilted, rotated, or any combination thereof with respect to a chassis of the AMD 104.

The network interfaces 208 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 196 in the event that communication falls using one or more of the WLAN interface 302 or the PAN interface 304. For example, in the event the AMD 104 travels to an area within the physical space that does not have Wi-Fi coverage, the AMD 104 may use the secondary RF link interface 306 to communicate with another device such as a specialized access point, docking station 192, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the LTE, 5G, 6 G, or other standards.

The AMD 104 may include one or more of the following sensors 134. The sensors 134 depicted here are provided by way of illustration and not necessarily as a limitation. It is understood that other sensors 134 may be included or utilized by the AMD 104, while some sensors 134 may be omitted in some configurations.

The joint encoder 136 provides information indicative of the rotation, linear extension, or other attribute regarding the position of an actuator 132. The actuator 132 may comprise a rotary motor, linear actuator, electroactive polymer, piezoelectric device, and so forth. In some implementations, the joint encoder 136 may comprise a separate assembly such as a photodiode and encoder wheel that is mechanically coupled to the joint 110. In other implementations, the joint encoder 136 may comprise circuitry configured to drive the actuator 132.

A suspension weight sensor 312 provides information indicative of the weight of the AMD 104 on the suspension system for one or more of the wheels 130 or the caster. For example, the suspension weight sensor 312 may comprise a switch, strain gauge, load cell, photodetector 342, or other sensing element that is used to determine whether weight is applied to a particular wheel 130, or whether weight has been removed from the wheel 130. In some implementations, the suspension weight sensor 312 may provide binary data such as a "1" value indicating that there is a weight applied to the wheel 130, while a "0" value indicates that there is no weight applied to the wheel 130. In other implementations, the suspension weight sensor 312 may provide an indication such as so many kilograms of force or newtons of force. The suspension weight sensor 312 may be affixed to one or more of the wheels 130 or the caster. In some situations, the safety module 218 may use data from the suspension weight sensor 312 to determine whether or not to inhibit operation of one or more of the actuators 132. For example, if the suspension weight sensor 312 indicates no weight on the suspension, the implication is that the AMD 104 is no longer resting on its wheels 130, and thus operation of the actuators 132 may be inhibited. In another example, if the suspension weight sensor 312 indicates weight that exceeds a threshold value, the implication is that something heavy is resting on the AMD 104 and thus operation of the actuators 132 may be inhibited. For example, the threshold value may comprise a weight of a load that compresses a suspension system to a minimum height, or results in a mass that exceeds a torque output of the actuators 132 driving the wheels 130 to maintain a minimum acceleration.

One or more bumper switches 314 provide an indication of physical contact between a bumper or other member that is in mechanical contact with the bumper switch 314. The safety module 218 utilizes sensor data 152 obtained by the bumper switches 314 to modify the operation of the AMD 104. For example, if the bumper switch 314 associated with a front of the AMD 104 is triggered, the safety module 218 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 KHz to determine a distance from the sensor 134 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 152 indicative of one or more of a presence or absence of an object, a distance to the object, or characteristics of the object. The optical sensor 320 may use time of flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 134 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 218 and the autonomous navigation module 164 may utilize the sensor data 152 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 KHz while a second optical sensor 320 emits light modulated at 33 kHz.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector 342 to determine the distance to which the mast is extended. In another implementation, the mast position sensor 324 may comprise an encoder wheel that is attached to a mast motor that is used to raise or lower the mast. The mast position sensor 324 may provide data to the safety module 218. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a side-load applied to the mast or a weight on the mast or downward pressure on the mast. The safety module 218 may utilize sensor data 152 obtained by the mast strain sensor 326. For example, if the strain applied to the mast exceeds a threshold amount, the safety module 218 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 218 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 280, one or more actuators 132, and so forth. In the event the temperature exceeds a threshold value, the component associated with that device temperature sensor 330 may be shut down. For example, the threshold value may be determined based on component specifications, such as a maximum permissible temperature of the batteries 280.

One or more interlock sensors 332 may provide data to the safety module 218 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyrometer 334 may provide information indicative of rotation of an object affixed thereto. For example, a gyrometer 334 may generate sensor data 152 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyrometer 334 in the accelerometer 336 may comprise a prepackaged solid-state inertial measurement unit (IMU) 364 that provides multiple axis gyrometers 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 152 indicative of impinging light. For example, the photodetector 342 may provide data indicative of a color, intensity, duration, and so forth.

A camera 344 generates sensor data 152 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data acquired by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 152 comprising images being sent to the autonomous navigation module 164. In another example, the camera 344 may comprise a 10 megapixel or greater camera that is used for videoconferencing or for acquiring pictures for the user 102.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 164 may be acquired using a rolling shutter and subsequently may be processed to mitigate image artifacts.

One or more microphones 346 may be configured to acquire information indicative of sound present in the physical space. In some implementations, arrays of microphones 346 may be used. These arrays may implement beamforming techniques to provide for directionality of gain. The AMD 104 may use the one or more microphones 346 to acquire information from acoustic tags, accept voice input from users, determine a direction of an utterance, determine ambient noise levels, for voice communication with another user 102 or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels 130 in contact with the floor may include an allegedly conductive pathway between the circuitry and the floor. By using two or more of these wheels 130, the circuitry may measure one or more of the electrical properties of the floor. Information obtained by the floor analysis sensor 356 may be used by one or more of the safety module 218, the autonomous navigation module 164, the task module 230, and so forth. For example, if the floor analysis sensor 356 determines that the floor is wet, the safety module 218 may decrease the speed of the AMD 104 and generate a notification alerting the user 102.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 134 may include a radar 360. The radar 360 may be used to provide information as to a distance, lateral position, and so forth, to an object.

The sensors 134 may include a passive infrared (PIR) sensor 362. The PIR sensor 362 may be used to detect the presence of users, pets, hotspots, and so forth. For example, the PIR sensor 362 may be configured to detect infrared radiation with wavelengths between 8 and 14 micrometers.

The AMD 104 may include other sensors 366 as well. For example, a capacitive proximity sensor may be used to provide proximity data to adjacent objects. Other sensors 366 may include radio frequency identification (RFID) readers, near field communication (NFC) systems, coded aperture cameras, and so forth. For example, NFC tags may be placed at various points within the physical space to provide landmarks for the autonomous navigation module 164. One or more touch sensors may be utilized to determine contact with a user 102 or other objects.

The AMD 104 may include one or more output devices 212. An actuator 132 may be used to provide linear or rotary motion. A light 382 may be used to emit photons. A speaker 384 may be used to emit sound. A display 108 may comprise one or more of a liquid crystal display, light emitting diode display, electrophoretic display, cholesteric liquid crystal display, interferometric display, and so forth. The display 108 may be used to present visible information such as graphics, pictures, text, and so forth. In some implementations, the display 108 may comprise a touchscreen that combines a touch sensor and a display 108.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

The actuators 392 may comprise an electrically operated mechanism such as one or more of a motor, solenoid, piezoelectric material, electroactive polymer, shape-memory alloy, and so forth. An actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user 102. Continuing the example, an actuator 132 with an eccentric weight may be used to create a buzz or vibration to allow the AMD 104 to simulate the purr of a cat.

Figure 4:
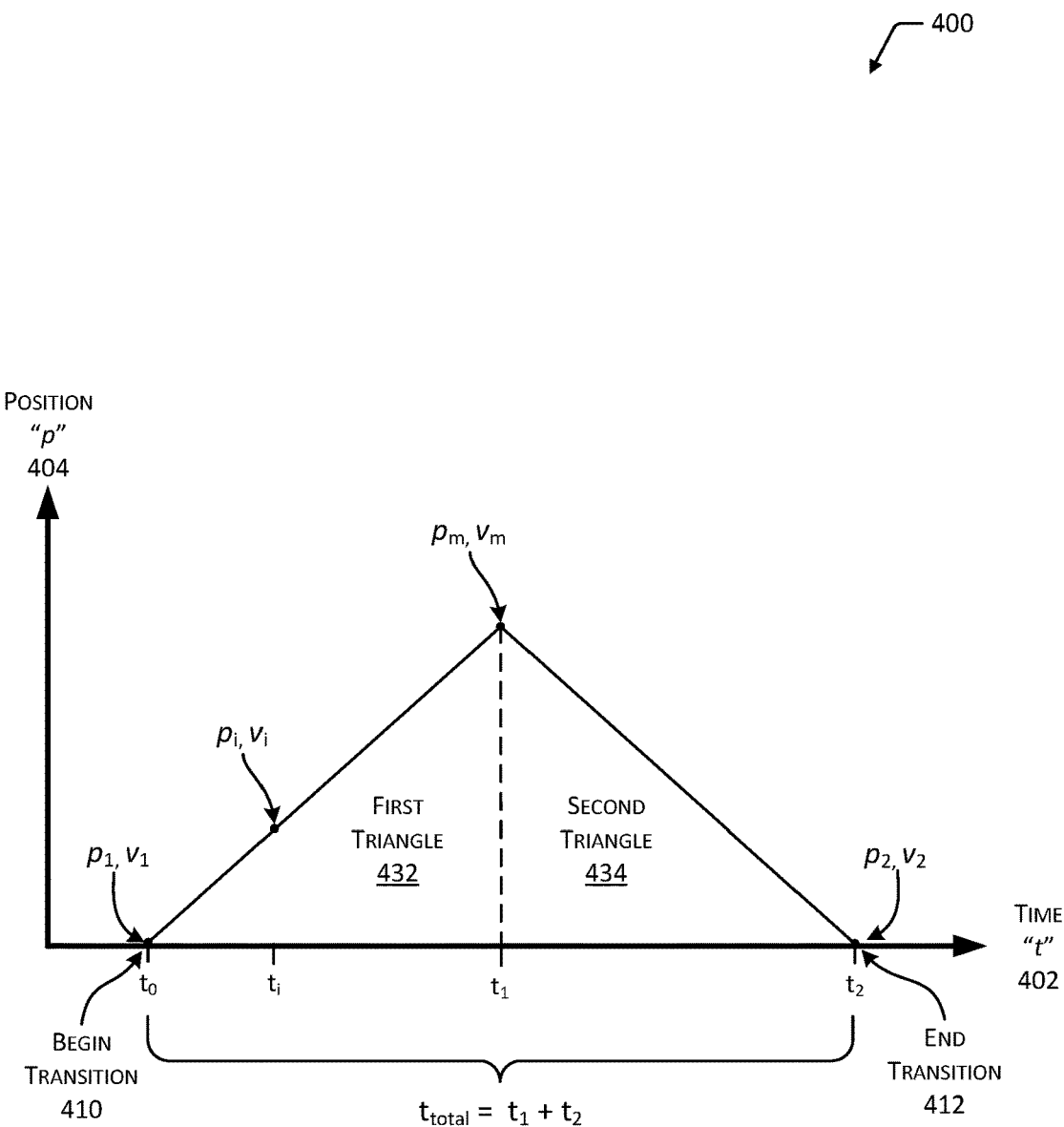
FIG. 4 is a diagram visualizing a starting position and velocity of a joint, and a final position and velocity, according to some implementations.

FIG. 4 is a diagram 400 visualizing a starting position and velocity, and a final position and velocity, according to some implementations. In this diagram 400, time 402 "t" is illustrated as a horizontal axis, increasing from left to right. A position 404 "p" of the joint 110 is illustrated as a vertical axis.

At to the system begins transition 410 to a second choreo specified by second choreo data 174. At $t_2$ the system ends transition 410 to the second choreo. An intermediate point in time $t_1$ is shown. A total time is shown as $t_{total}=t_1+t_2$.

At $t_0$ the joint 110 is in a first position $p_1$ and a first velocity $v_1$. The first position and the first velocity may be any position and any velocity that is within the physical capability of the joint 110. At $t_1$ the joint 110 is in an intermediate position $p_m$ and an intermediate velocity $v_m$. At $t_2$ the joint 110 is in a second position $p_2$ and a second velocity $v_2$. The second position and the second velocity correspond to a position and velocity of a corresponding time as specified in the second choreo data 174.

A first triangle 432 may be visualized as a right triangle having a hypotenuse with ends specified by the first position and the first velocity, and the intermediate position and the intermediate velocity. A second triangle 434 may be visualized as a right triangle having a hypotenuse with ends specified by the intermediate position and the intermediate velocity, and the second position and the second velocity.

The second position and second velocity associated with $t_2$ may be deemed a feasible point. A feasible point may be defined such that $t_{initial}$, $p_{initial}$, $v_{initial}$ can reach $t_{final}$, $p_{final}$, $v_{final}$ under the kinematic constraints of the joint: $v_{max}$, $a_{max}$, $p_{limits}$ as specified in the constraint data 172.

The optimization algorithm implemented by the motion merger module 176 attempts to determine the positions and velocities of a pair of first triangle 432 and second triangle 434 that meets the following constraints:

First Triangle 432:

$$p_m = p_1 + v_i t_1 + \frac{1}{2} a_1 t_1^2 \qquad \text{EQUATION 1}$$

$$v_m = v_1 + a_1 * t_1 \qquad \text{EQUATION 2}$$

Second Triangle 434:

$$p_f = p_m + v_m t_2 + \frac{1}{2} a_2 t_2^2 \qquad \text{EQUATION 3}$$

$$v_f = v_m + a_2 * t_2 \qquad \text{EQUATION 4}$$

Total:

$$t_{total} = t_1 + t_2 \qquad \text{EQUATION 5}$$

The following table depicts illustrative descriptions for the parameters of these equations, and a parenthetical indicative of whether the value is known or unknown.

TABLE 1

| $t_1$ | Relative time of the first triangle (unknown) | $t_2$ | Relative time of the second triangle (unknown) |
|---|---|---|---|
| $p_1$ | The actual initial point (known) | $p_f$ | The final point where the merged motion intersects the choreo (known) |

TABLE 1-continued

| | | | |
|---|---|---|---|
| $v_1$ | The actual initial velocity (known) | $v_f$ | The final velocity where the merged motion intersects the choreo (known) |
| $p_m$ | The position at the end of the first triangle, and the start of the second triangle (unknown) | $v_m$ | The velocity at the end of the first triangle, and the start velocity of the second triangle (unknown) |
| $\alpha_1$ | The acceleration of the first triangle (unknown) | $\alpha_2$ | The acceleration of the second triangle (unknown) |
| $t_{total}$ | The total time to merge to the choreo (unknown) | | |

The motion merger module 176 attempts to determine a closed form solution to solve for the following:

$$t_1, a_1, a_2 \qquad \text{EQUATION 6}$$

However, as illustrated with regard to TABLE 1, there are more unknown parameters than known. This may be addressed by utilizing a constraint optimization solution to solve for $a_1$ and $a_2$. The constrained optimization problem may be resolved by reducing the number of parameters in the equation set described by Equations 1-5 to:

$$a_1, a_2 \qquad \text{EQUATION 7}$$

An optimization function may now be determined using Lagrange multipliers as follows:

$$L(a_1,a_2,\lambda)=f(a_1,a_2)-\lambda g(a_1,a_2) \text{ where } \nabla L(a_1,a_2,\lambda)=0 \nabla f(a_1,a_2)=\lambda g(a_1,a_2) \qquad \text{EQUATION 8}$$

Lagrange multipliers are advantageous because they offer a closed form constant runtime solution unlike iterative techniques such as gradient descent. The optimization function is chosen with respect to the constraints to make the functions solvable. One such consideration is choosing an optimization function which guarantees a convex hull.

$$\text{optimization}=f(a_1,a_2)=(a_1-a_2)^2 \qquad \text{EQUATION 9}$$

As shown in Equation 9, "$a_1-a_2$" is chosen in order to minimize the difference between $a_1$ and $a_2$. The optimization function moves $a_2$ as close to $a_1$ as possible. The squared term is added in order to guarantee a convex shape with respect to the parameters.

The constraint function is solved from substituting the above equations until the equation is reduced to two parameters as follows:

$$\text{constraint} = g(a_1, a_2) \qquad \text{EQUATION 10}$$

$$\frac{1.0\left(-0.5 a_1 a_2 t_{total}^2 + 1.0 a_1 p_1 - 1.0 a_1 p_2 + 1.0 a_1 t_{total} v_2 - 1.0 a_2 p_1 + 1.0 a_2 p_2 - 1.0 a_2 t_{total} v_1 - 0.5 v_1^2 + 1.0 v_1 v_2 - 0.5 v_2^2\right)}{a_1 - a_2}$$

The Lagrangian may then be solved as follows:
Solving for the partial of $$\nabla f(a_1, a_2) \text{ and } \nabla g(a_1, a_2) \qquad \text{EQUATION 11}$$

$$\frac{0.5 a_2^2 t_{total}^2 + 1.0 a_2 t_{total} v_1 - 1.0 a_2 t_{total} v_2 + 0.5 v_1^2 - 1.0 v_1 v_2 + 0.5 v_2^2}{1.0 a_1^2 - 2.0 a_1 a_2 + 1.0 a_2^2}$$

$$\nabla f(a_1, a_2) = \frac{0.5 a_1^2 t_{total}^2 - 1.0 a_1 t_{total} v_1 + 1.0 a_1 t_{total} v_2 - 0.5 v_1^2 + 1.0 v_1 v_2 - 0.5 v_2^2}{1.0 a_1^2 - 2.0 a_1 a_2 + 1.0 a_2^2} \qquad \text{EQUATION 12}$$

$$\nabla g(a_1, a_2) = \begin{matrix} 2a_1 - 2a_2 \\ -2a_1 + 2a_2 \end{matrix} \qquad \text{EQUATION 13}$$

$$\nabla f(a_1,a_2)=\lambda g(a_1,a_2) \qquad \text{EQUATION 14}$$

$$\lambda = \left[ \frac{4.0\left(a_1^3 - 3.0 a_1^2 a_2 + 3.0 a_1 a_2^2 - a_2^3\right)}{a_1^2 t_{total}^2 + 2.0 a_1 t_{total} v_1 - 2.0 a_1 t_{total} v_2 + v_1^2 - 2.0 v_1 v_2 + v_2^2} \right] \qquad \text{EQUATION 15}$$

A constrained optimization solution may now be determined that uses the following inputs: $p_1$, $v_1$, and a specified index point on the second choreo. The resulting accelerations may be deemed optimal accelerations to merge a current trajectory of the joint 110 into a trajectory of the joint 110 as described by the second choreo data 174 while maintaining the kinematic and merger constraints specified by the constraint data 172. A first acceleration $a_1$ associated with the first triangle 432 and a second acceleration $a_2$ associated with the second triangle 434 may be determined using the following equations:

$$a_1 = \left[\frac{-a_2 t_{total} - 2.0 v_1 + 2.0 v_2}{t_{total}}\right] \quad \text{EQUATION 16}$$

$$a_2 = \left[\frac{4.0 p_1 - 4.0 p_2 + t_{total}(v_1 + 3.0 v_2)}{t_{total}^2}\right] \quad \text{EQUATION 17}$$

Using these equations, the algorithm may be used to determine a feasible point in time at which the joint 110 may be moved that results in a merger to the motions specified by the second choreo data 174.

In one implementation, a first feasible point may be determined as a closest feasible point on a curve of the position 404 with respect to time 402. An index may be specified that designates a specified time of the second choreo data 174. The algorithm may begin at a second index of the second choreo data 174. The algorithm uses the equations described above to solve for $a_1$, $a_2$, and $v_{max}$ and verifies the resulting values are within the specified kinematic limits in the constraint data 172. If the resulting values are not within the kinematic limits, the algorithm continues to iterate forward to the next time index until the kinematic constraints are satisfied. This is illustrated as follows:

$$a_1, a_2, v_{max} < \text{kinematic constraints} \quad \text{EQUATION 18}$$

The feasible point may thus comprise $t_2$ as shown in FIG. 4, that specifies our end of transition 412. The algorithm now proceeds to determine one or more of next position or next velocity to move the joint 110 in the intervening times between when the transition begins 410 at $t_0$ and the end of the transition 412 at $t_2$. These next positions and next velocities may be determined using the following equations, where "/" indicates the time index and dt indicates a change in time.

$$p_{i+1} = p_i + v_i * dt \quad \text{EQUATION 19}$$

$$v_{i+1} = v_i + a_1 * dt, \text{ wherein } t < t_1 \quad \text{EQUATION 20}$$

$$v_{i+1} = v_i + a_1 * dt, \text{ wherein } t_1 < t < t_2 \quad \text{EQUATION 21}$$

The set of one or more next positions or next velocities determined using equations 19-21 may be deemed the transition choreo 178. The transition choreo 178 is then used to operate the actuator(s) 132 to move the joint 110.

The choreo data 174 may be previously determined and stored, or may be determined based on other input. For example, the second choreo data 174 may comprise a pre-determined set of movements that when executed produce a particular set of motions of the joint 110. In another example, the second choreo data 174 may comprise a function or algorithm that accepts input and produces the set of movements to produce a particular set of motions of the joint 110. Continuing this example, a function may accept as input an audio waveform and may produce as output choreo data 174 to provide movement of the joint 110 that corresponds to the audio waveform that is being presented to the user 102 in the physical space, allowing the AMD 104 to "dance".

Figure 5:
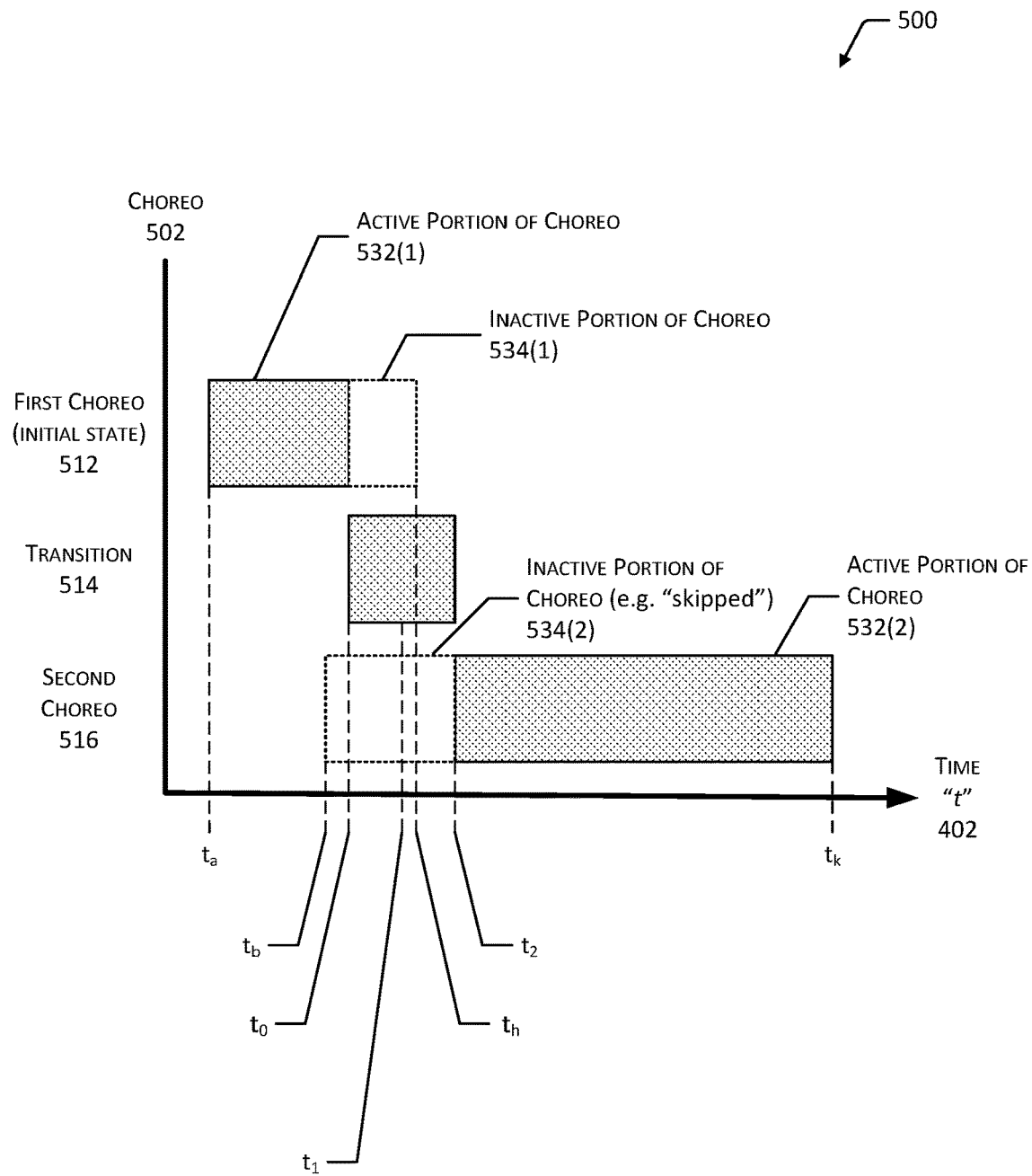
FIG. 5 is a timing diagram of a first choreo, a transition, and a second choreo, according to some implementations.

FIG. 5 is a timing diagram 500 of a first choreo 512 or initial state, a transition 514, and a second choreo 516, according to some implementations. In this diagram, the time 402 "t" is illustrated as the horizontal axis, increasing from left to right. A vertical axis depicts the choreo 502 including the first choreo 512 such as specified by first choreo data 174, the transition 514 such as specified by the transition choreo 178, and the second choreo 516 specified by the second choreo data 174.

With respect to time 402, $t_0$, $t_1$, and $t_2$ are depicted. At time $t_a$ the choreo module 170 is performing the first choreo 512. A choreo may have an active portion 532 and an inactive portion 534. The active portion 532 is a portion of the choreo that is used to operate the joint 110. In comparison, the inactive portion 534 is a portion of the choreo that is not used to operate the joint 110.

The choreo module 170 then determines that the second choreo 516 is to be performed, with a proposed start time of $t_b$ that is after $t_a$ and before $t_0$. The motion merger module 176 utilizes the algorithm described with respect to FIG. 4 to begin the transition at time to and determine time $t_2$. An active portion of the choreo 532(1) is performed from time $t_a$ to $t_0$. At time $t_0$ the first choreo 512 becomes inactive, resulting in an inactive portion of choreo 534(1) that continues until $t_h$. Motion of the joint 110 is now based on the transition 514 based on one or more of the next positions or next velocities determined by the algorithm as described above with regard to FIG. 4. In this illustration, time 402 continues and the second choreo 516 begins at time $t_b$ with an inactive portion of choreo 534(2). The inactive portion of choreo 534(2) may be considered the portion of the second choreo 516 that is skipped. This maintains time synchronization of the second choreo 516 to a specified time reference, such as the output from the clock 202. However, as mentioned above between times $t_0$ and $t_2$ motion of the joint 110 is based on the output from the algorithm. At $t_2$ the motions of the joint 110 have converged to the motions specified by the second choreo 516 and an active portion of the choreo 532(2) begins and continues until time $t_k$.

Figure 6:
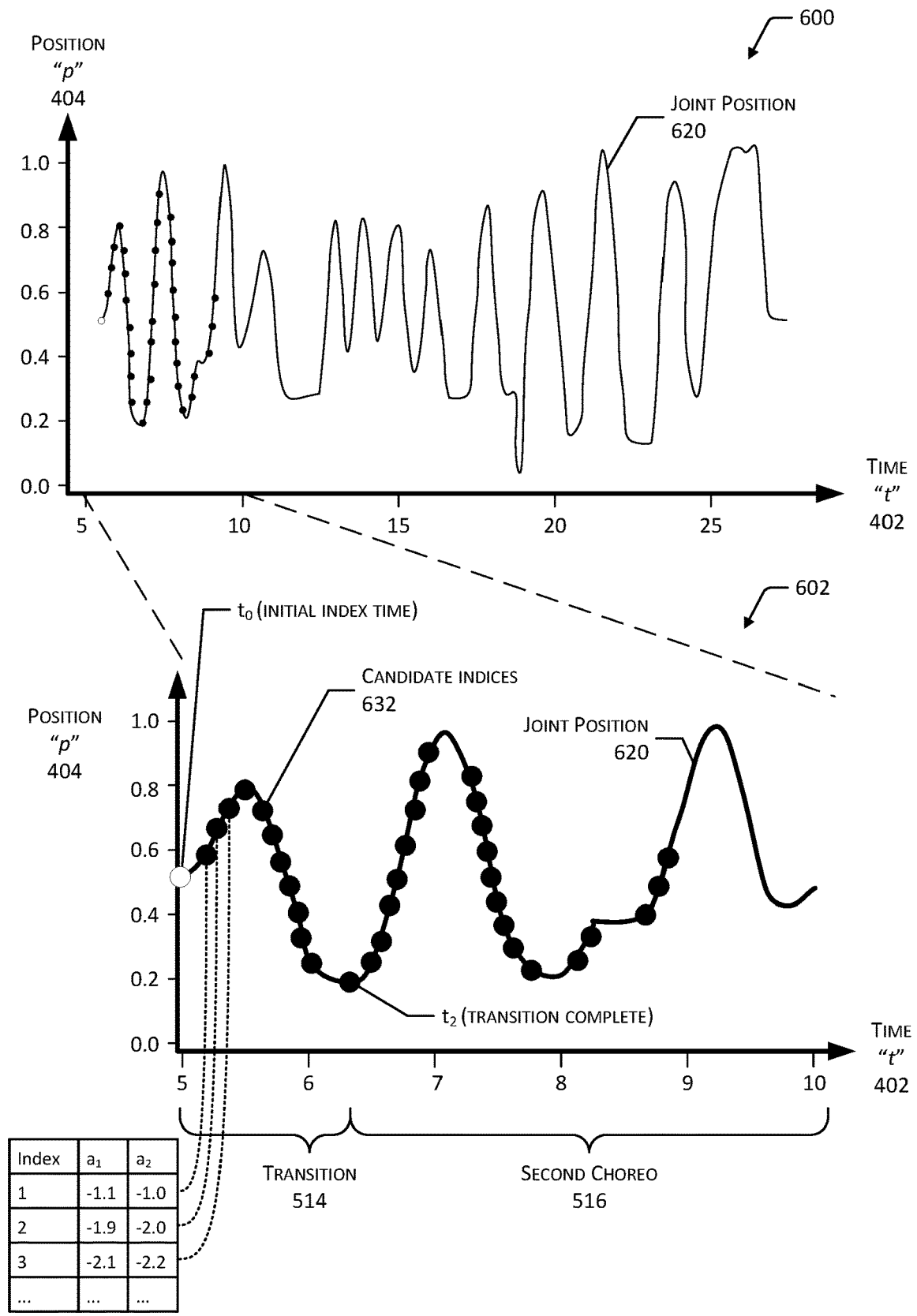
FIG. 6 is a time and position graph of the joint with an enlargement of the transition and the second choreo, according to some implementations.

FIG. 6 is a time and position graph 600 of the joint 110 with an enlarged view 602 showing the transition 514 and the second choreo 516, according to some implementations. In this diagram, the time 402 "t" is illustrated as a horizontal axis, increasing from left to right. The position 404 "p" of the joint 110 is illustrated as a vertical axis. The graphs 600 and 602 depict a joint position 620 indicative of a position 404 of the joint 110 at respective times 402.

Shown in the enlarged view 602 is to that is designated as an initial index time, and a plurality of candidate indices 632. An individual candidate index 632 may be associated with a specific time index value. In some implementations the candidate indices 632 may comprise a predetermined number of indices with respect to $t_0$. For example, the candidate Indices 632 may comprise 100 time index values following $t_0$. Continuing the example, pairs of first accelerations ($a_1$) and second accelerations ($a_2$) are shown for some of the candidate indices 632 during the transition 514 time.

Also shown is the joint position 620 at $t_2$ when the transition to the second choreo 516 is complete.

Figure 7:
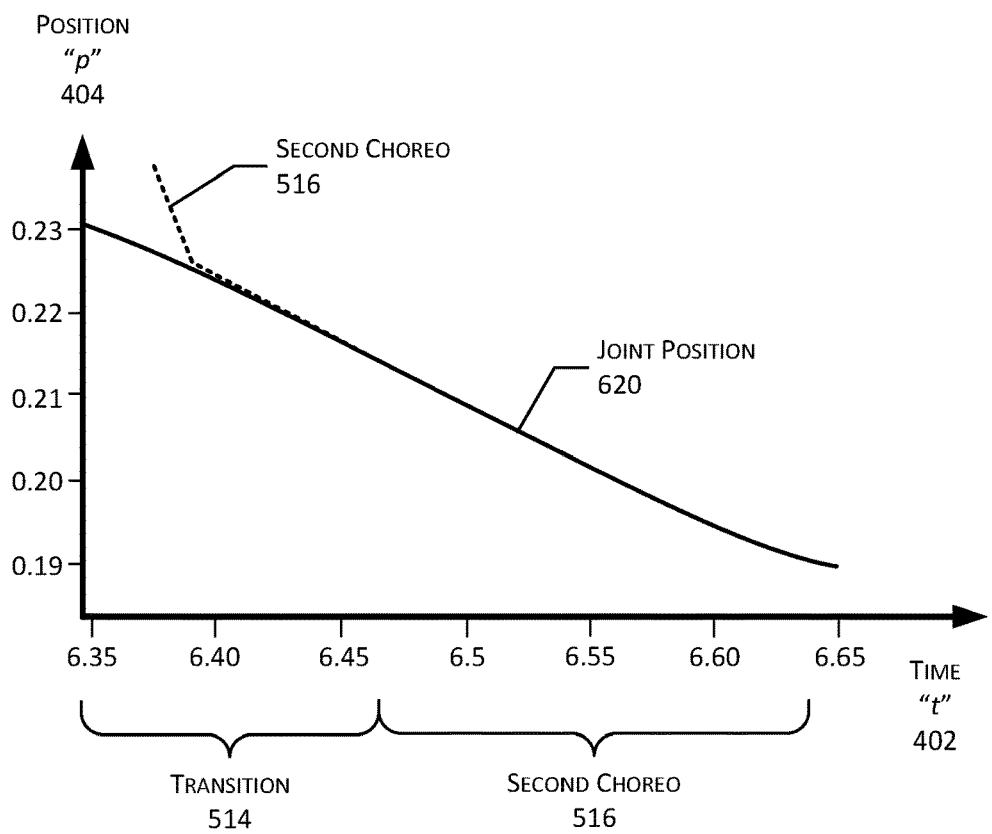
FIG. 7 is an enlarged view of a time and position graph of the joint during the transition and the second choreo, according to some implementations.

FIG. 7 is an enlarged view of a time and position graph 700 of the joint 110 during the transition 514 and the second choreo 516, according to some implementations. In this diagram, the time 402 "t" is illustrated as a horizontal axis, increasing from left to right. The position 404 "p" of the joint 110 is illustrated as a vertical axis.

The joint position 620 is shown, as is the proposed position as specified by the second choreo 516. As described with regard to FIG. 5, until the transition 514 is complete at $t_2$, the inactive portion of the choreo 534(2) results in the actuator(s) 132 of the joint 110 not being operated to move to the position specified by the second choreo 516. Instead, the transition 514 proceeds to operate the actuator(s) 132 of the joint 110 being operated to move to the next positions and next velocities as described above with regard to FIG. 4. As a result, the joint position 620 converges over time to a position specified by the second choreo 516.

Figure 8:
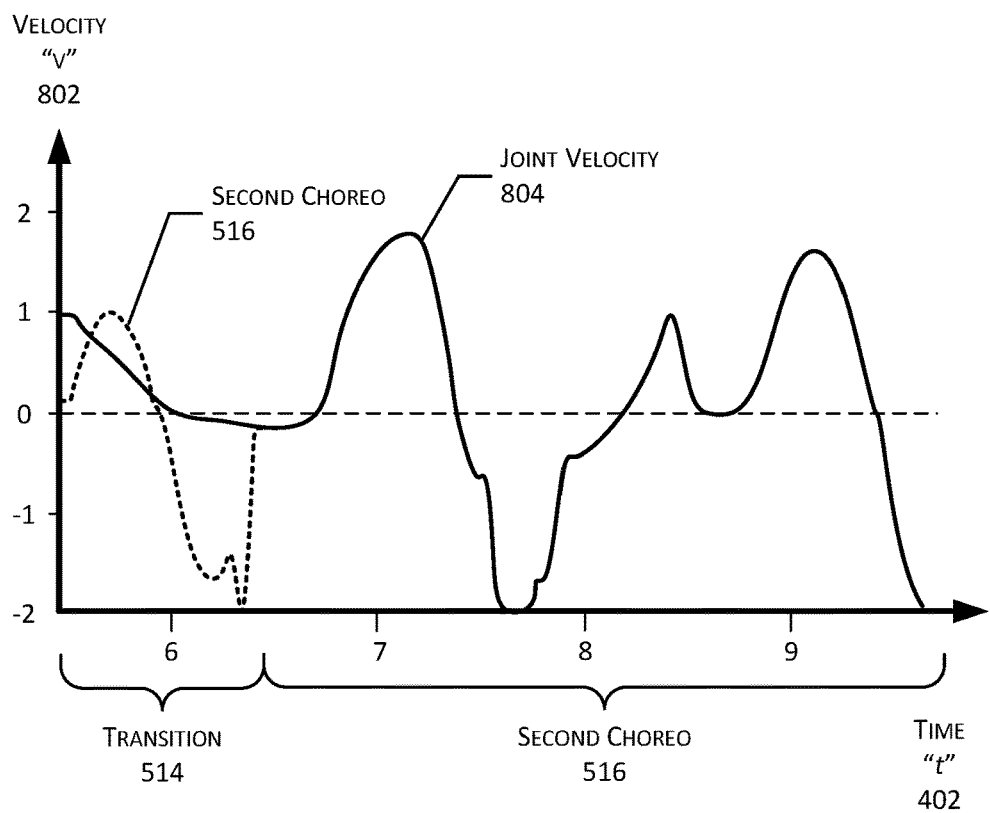
FIG. 8 is an enlarged view of a time and velocity graph of the joint during the transition and the second choreo, according to some implementations.

FIG. 8 is an enlarged view of a time and velocity graph 800 of the joint 110 during the transition 514 and the second choreo 516, according to some implementations. In this diagram, the time 402 "t" is illustrated as a horizontal axis, increasing from left to right. A velocity "v" 802 of the joint 110 is illustrated as a vertical axis.

As described with regard to FIG. 5, until the transition 514 is complete at $t_2$, the inactive portion of the choreo 534(2) results in the actuator(s) 132 of the joint 110 not being operated to move to the position specified by the second choreo 516. Instead, the transition 514 proceeds to operate the actuator(s) 132 of the joint 110 being operated to move to the next positions and next velocities as described above with regard to FIG. 4. As a result, a joint velocity 804 converges over time to a velocity corresponding to the second choreo 516.

Figure 9:
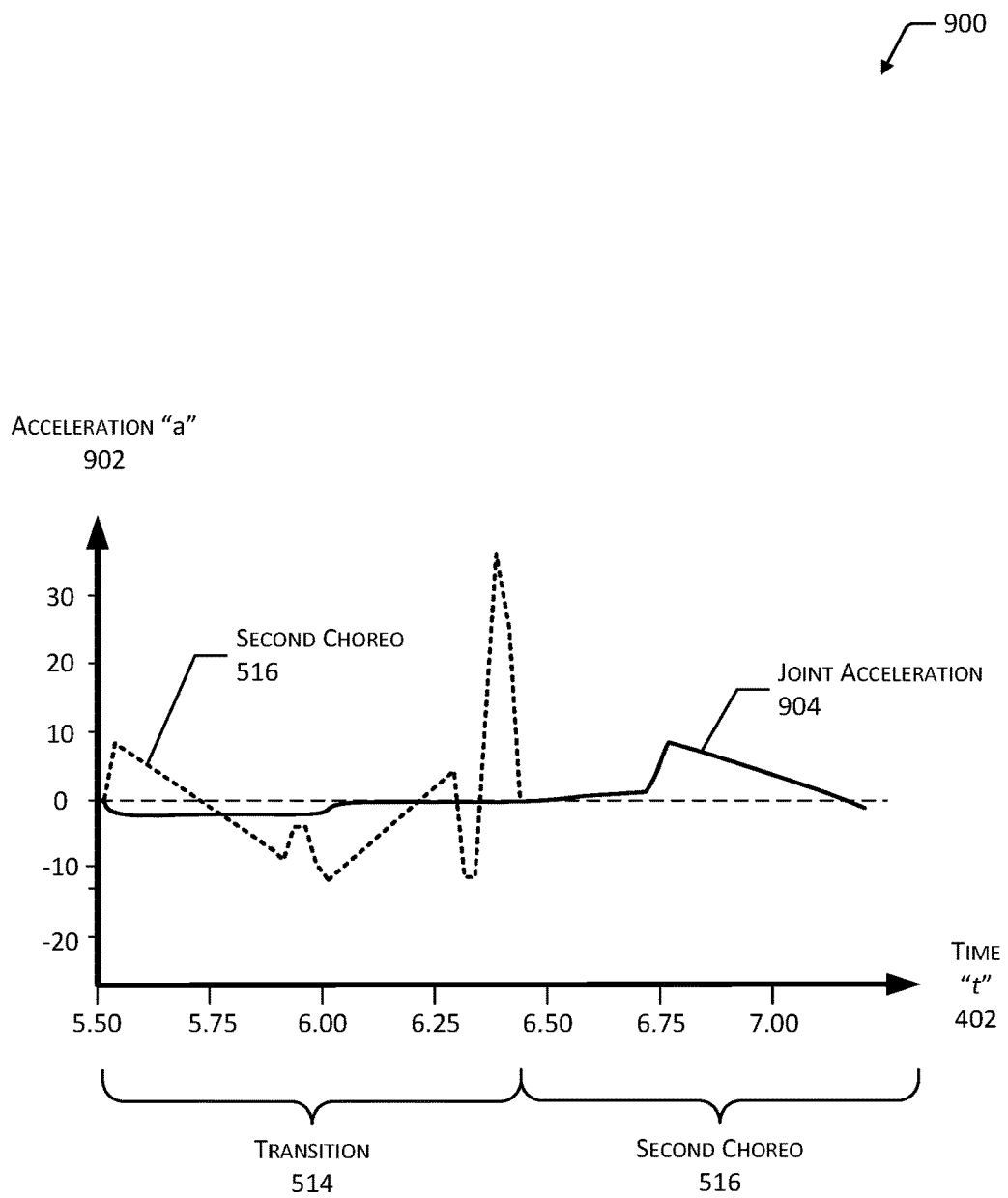
FIG. 9 is an enlarged view of a time and acceleration graph of the joint during the transition, and the second choreo, according to some implementations.

FIG. 9 is an enlarged view of a time and acceleration graph 900 of the joint 110 during the transition 514, and the second choreo 516, according to some implementations. In this diagram, the time 402 "t" is illustrated as a horizontal axis, increasing from left to right. An acceleration 902 "a" of the joint 110 is illustrated as a vertical axis.

As described with regard to FIG. 5, until the transition 514 is complete at $t_2$, the inactive portion of the choreo 534(2) results in the actuator(s) 132 of the joint 110 not being operated to move to the position specified by the second choreo 516. Instead, the transition 514 proceeds to operate the actuator(s) 132 of the joint 110 being operated to move to the next positions and next velocities as described above with regard to FIG. 4. As a result, a joint acceleration 904 converges over time to an acceleration corresponding to the second choreo 516.

Figure 10:
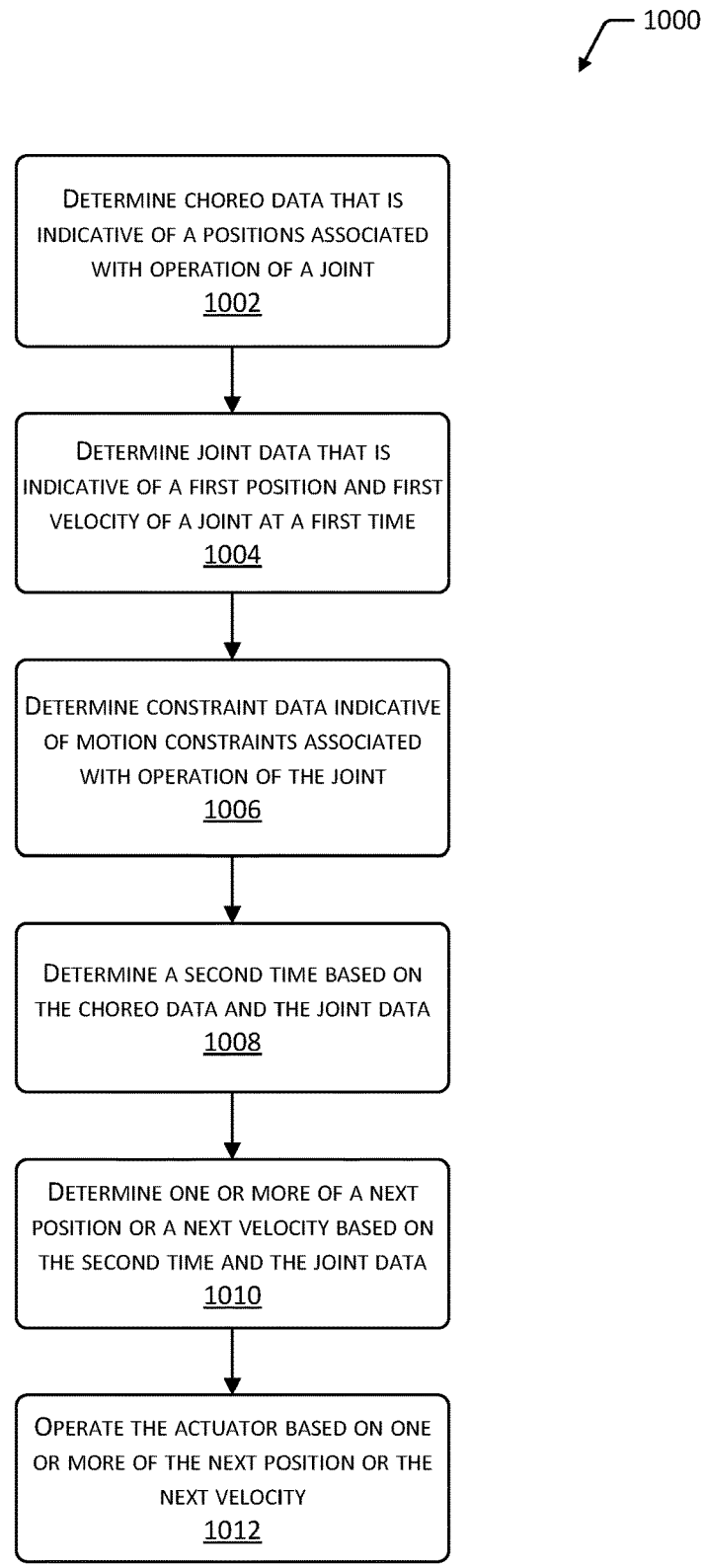
FIG. 10 is a flow diagram of a process to transition from an initial state to a second choreo, according to some implementations.

FIG. 10 is a flow diagram 1000 of a process to transition from an initial state to a second choreo 516, according to some implementations. The process may be performed by the AMD 104 or other devices 196.

At 1002 choreo data 174 is determined. The choreo data 174 may be indicative of information about a plurality of positions associated with operation of a joint 110 or an actuator 132 associated with the joint 110 at respective specified times. For example, the choreo data 174 may comprise a time series of positions retrieved from memory 150 and provided to the choreo module 170 for execution.

At 1004 at a first time joint data 154 or actuator data is determined. The joint data 154 is indicative of one or more of a position, velocity, acceleration, distance, and so forth of the joint 110 or the actuator 132 associated with the joint 110 at the first time. For example, the joint encoder 136 may be used to determine the joint data 154.

At 1006 constraint data 172 is determined. The constraint data 172 is indicative of one or more of motion or kinematic constraints associated with operation of the joint 110 or the actuator 132 associated with the joint 110. For example, the constraint data 172 may specify a maximum velocity, maximum acceleration, and so forth.

At 1008 a second time is determined based on the second choreo data 174, the joint data 154. The second time is determined with respect to the first time. For example, the first time may be $t_0$ and the second time may comprise the calculated $t_2$ as described above with regard to FIG. 4.

At 1010 one or more of a next position or a next velocity are determined based on the second time and the joint data 154. For example, as described above with regard to FIG. 4 one or more of the next velocity or the next position are calculated for time indices after the first time, based on the previous state of the joint 110 and the second position and second velocity associated with the second time $t_2$.

At 1012 the one or more actuators 132 associated with the joint 110 are operated based on one or more of the next position or the next velocity as determined previously. The process may return to 1010 and iterate until one or more of the position or the velocity of the joint 110 converges with the position or velocity specified by the choreo data 174.

In some implementations the systems and techniques described in this disclosure may be used in other contexts. For example, instead of moving a joint, the systems and techniques may be used to steer a device, such an autonomous vehicle to move to a docking station, landing site, or other specified location.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
    a first joint comprising an actuator;
    a first sensor associated with the first joint; and
    one or more processors to execute instructions to:
        determine choreo data comprising information about a plurality of positions of the first joint at respective specified times;
        determine, using the first sensor, first joint data indicative of a first position and a first velocity of the first joint at a first time, wherein the first time represents a beginning of a transition towards one of the plurality of positions of the first joint within the choreo data;
        determine, based on the choreo data and the first joint data, a first set of values comprising a plurality of first accelerations and a corresponding plurality of second accelerations, wherein each of the first and second accelerations are associated with a respective time of the specified times;
        determine constraint data indicative of one or more kinematic constraints of the first joint;
        determine, based on the constraint data, a first subset of the first set of values;
        determine, based on the choreo data, the first joint data, the constraint data, and the first subset of the first set of values, a second time that is after the first time, wherein the second time represents an end of the transition;
        determine, based on the second time and the first joint data, one or more of a next position or a next velocity of the first joint at a next time, wherein the next time represents a time during the transition; and
        operate the actuator at the next time based on one or more of the next position or the next velocity.

2. The device of claim 1, wherein the one or more processors further execute the instructions to:
    determine the respective specified times associated with respective ones of the first set of values of the first subset; and
    determine the second time based on the respective specified times associated with the first subset.

3. The device of claim 1, wherein the one or more processors further execute the instructions to:
    determine the first accelerations using the following equation:

$$a_1 = \left[\frac{-a_2 t_{total} - 2.0 v_1 + 2.0 v_2}{t_{total}}\right]$$

determine the second accelerations using the following equation:

$$a_2 = \left[\frac{4.0 p_1 - 4.0 p_2 + t_{total}(v_1 + 3.0 v_2)}{t_{total}^2}\right]$$

wherein:
        $p_1$ is the first position of the first joint at the first time,
        $p_2$ is a second position of the first joint at the respective specified times,
        $v_1$ is the first velocity of the first joint at the first time,
        $v_2$ is a second velocity of the first joint at the respective specified times, and
        $t_{total}$ is a difference between the respective specified times and the first time.

4. The device of claim 3, wherein the one or more processors further execute the instructions to:
    determine one or more of the next position "$p_{i+1}$" or the next velocity "$v_{i+1}$" using the following equations:

$$p_{i+1} = p_i + v_i * dt$$

$$v_{i+1} = v_i + a_1 * dt, \text{ wherein } t < t_1$$

$$v_{i+1} = v_i + a_1 * dt, \text{ wherein } t_1 < t < t_2$$

wherein:
        $p_i$ is a third position of the first joint at a current time,
        $v_i$ is the first velocity of the first joint at the current time,
        $v_1$ is the first velocity of the first joint at the first time,
        $t_2$ is the second time, and
        dt is a change in time.

5. The device of claim 1, wherein the constraint data is indicative of one or more of a maximum acceleration of the first joint or a maximum velocity of the first joint.

6. The device of claim 1, wherein the one or more processors further execute the instructions to:
    determine one or more parameters associated with operation of the device; and
    determine one or more values of at least a portion of the constraint data based at least in part on the one or more parameters.

7. A computer-implemented method comprising:
    determining choreo data comprising information about a plurality of positions of a first joint at respective specified times;
    determining first joint data indicative of a first position and a first velocity of the first joint at a first time;
    determining, based on the choreo data and the first joint data, a first set of values comprising a plurality of first accelerations and a corresponding plurality of second accelerations, wherein each of the first and second accelerations are associated with the first time and a respective time of the specified times;
    determining constraint data indicative of one or more kinematic constraints of the first joint;
    determining, based on the constraint data, a first subset of the first set of values; and determining, based on the choreo data, the first joint data, the constraint data, and the first subset of the first set of values, a second time that is after the first time, wherein the second time represents an end of a transition towards one of the plurality of positions of the first joint comprised within the choreo data;

determining, based on the second time and the first joint data, one or more of a next position or a next velocity of the first joint at a next time, wherein the next time represents a time during the transition; and operating an actuator associated with the first joint at the next time based on one or more of the next position or the next velocity.

8. The computer-implemented method of claim 7, further comprising:

determining the respective specified times associated with respective ones of the first set of values of the first subset; and determining the second time based on the respective specified times associated with the first subset.

9. The computer-implemented method of claim 7, further comprising:

determining the first accelerations using the following equation:

$$a_1 = \left[\frac{-a_2 t_{total} - 2.0v_1 + 2.0v_2}{t_{total}}\right]$$

determining the second accelerations using the following equation:

$$a_2 = \left[\frac{4.0p_1 - 4.0p_2 + t_{total}(v_1 + 3.0v_2)}{t_{total}^2}\right]$$

wherein:

$p_1$ is the first position of the first joint at the first time, $p_2$ is a second position of the first joint at the respective specified times, $v_1$ is the first velocity of the first joint at the first time, $v_2$ is a second velocity of the first joint at the respective specified times, and $t_{total}$ is a difference between the respective specified times and the first time.

10. The computer-implemented method of claim 9, further comprising:

determining one or more of the next position "$p_{i+1}$" or the next velocity "$v_{i+1}$" using the following equations:

$$p_{i+1} = p_i + v_i * dt$$

$$v_{i+1} = v_i + a_1 * dt, \text{ wherein } t < t_1$$

$$v_{i+1} = v_i + a_1 * dt, \text{ wherein } t_1 < < t_2$$

wherein:

$p_i$ is a third position of the first joint at a current time, $v_i$ is the first velocity of the first joint at the current time, $v_1$ is the first velocity of the first joint at the first time, $t_2$ is the second time, and dt is a change in time.

11. The computer-implemented method of claim 7, wherein the constraint data is indicative of one or more of a maximum acceleration of the first joint or a maximum velocity of the first joint.

12. The computer-implemented method of claim 7, further comprising:

determining one or more parameters associated with operation of the actuator; and determining one or more values of at least a portion of the constraint data based at least in part on the one or more parameters.

13. A device comprising:

an actuator; and one or more processors to execute instructions to:

determine choreo data comprising information about a plurality of positions of the actuator at respective specified times;

determine actuator data indicative of a first position and a first velocity of the actuator at a first time;

determine, based on the choreo data and the actuator data, a first set of values comprising a plurality of first accelerations and a corresponding plurality of second accelerations, wherein each of the first and second accelerations are associated with a respective time of the specified times;

determine constraint data indicative of one or more kinematic constraints associated with the actuator;

determine, based on the constraint data, a first subset of the first set of values;

determine, based on the choreo data, the actuator data, the constraint data, and the first subset of the first set of values, a second time that is after the first time, wherein the second time represents an end of a transition;

determine, based on the second time and the actuator data, one or more of a next position or a next velocity of the actuator at a next time, wherein the next time represents a time during the transition; and operate the actuator at the next time based on one or more of the next position or the next velocity.

14. The device of claim 13, wherein the one or more processors further execute the instructions to:

determine the respective specified times associated with respective ones of the first set of values of the first subset; and determine the second time based on the respective specified times associated with the first subset.

15. The device of claim 13, wherein the one or more processors further execute the instructions to:

determine the first accelerations using the following equation:

$$a_1 = \left[\frac{-a_2 t_{total} - 2.0v_1 + 2.0v_2}{t_{total}}\right]$$

determine the second accelerations using the following equation:

$$a_2 = \left[\frac{4.0p_1 - 4.0p_2 + t_{total}(v_1 + 3.0v_2)}{t_{total}^2}\right]$$

wherein:

$p_1$ is the first position of the actuator at the first time, $p_2$ is a second position of the actuator at the respective specified times, $v_1$ is the first velocity of the actuator at the first time, $v_2$ is a second velocity of the actuator at the respective specified times, and and $t_{total}$ is a difference between the respective specified times and the first time.

16. The device of claim 15, wherein the one or more processors further execute the instructions to:
determine one or more of the next position "$p_{i+1}$" or the next velocity "$v_{i+1}$" using the following equations:

$$p_{i+1}=p_i+v_i*dt$$

$$v_{i+1}=v_i+a_1*dt, \text{ wherein } t<t_1$$

$$v_{i+1}=v_i+a_1*dt, \text{ wherein } t_1<t<t_2$$

wherein:
- $p_i$ is a third position of the actuator at a current time,
- $v_i$ is the first velocity of the actuator at the current time,
- $v_1$ is the first velocity of the actuator at the first time,
- $t_2$ is the second time, and
- dt is a change in time.

17. The device of claim 13, wherein the one or more processors further execute the instructions to:
determine one or more parameters associated with operation of the device; and
determine one or more values of at least a portion of the constraint data based at least in part on the one or more parameters.

* * * * *

UNITED STATES PATENT AND TRADEMARK OFFICE
CERTIFICATE OF CORRECTION

| | | |
|---|---|---|
| PATENT NO. | : 12,397,423 B1 | Page 1 of 1 |
| APPLICATION NO. | : 18/064810 | |
| DATED | : August 26, 2025 | |
| INVENTOR(S) | : Babak Kianmajd et al. | |

It is certified that error appears in the above-identified patent and that said Letters Patent is hereby corrected as shown below:

In the Claims

Column 28, Claim 4, Line 34:
Currently reads "$v_{1+1}=$"
Where it should read --$v_{i+1}=$--

Column 29, Claim 10, Line 57:
Currently reads "$t_1 <<< t_2$"
Where it should read --$t_1 < t < t_2$--

Signed and Sealed this
Thirtieth Day of September, 2025

John A. Squires
*Director of the United States Patent and Trademark Office*